Oct. 11, 1960 J. K. GODBEY ET AL 2,955,463
LOGGING SYSTEM FOR WELL BORES
Filed Jan. 17, 1955 5 Sheets-Sheet 4
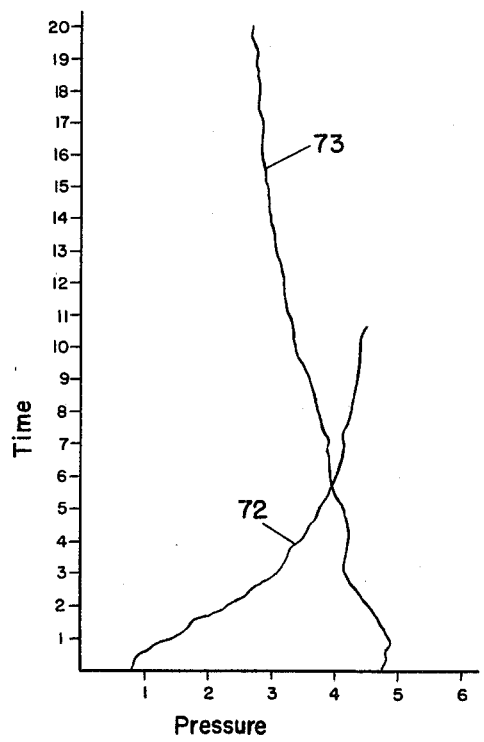
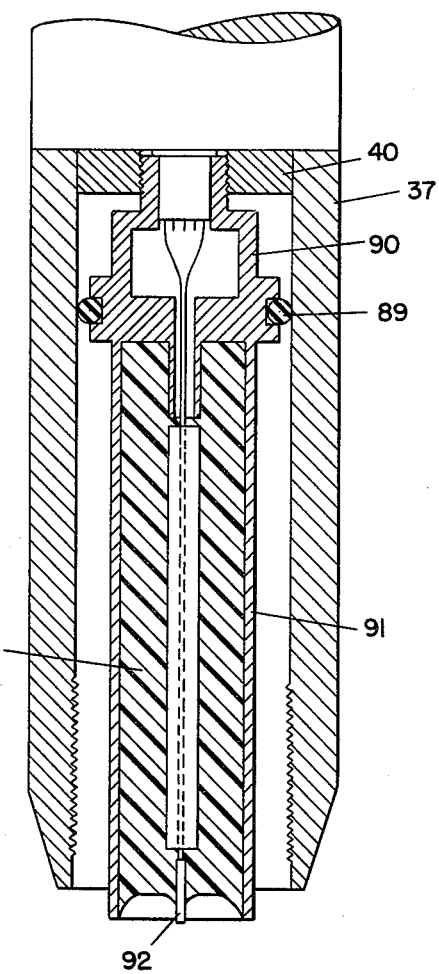

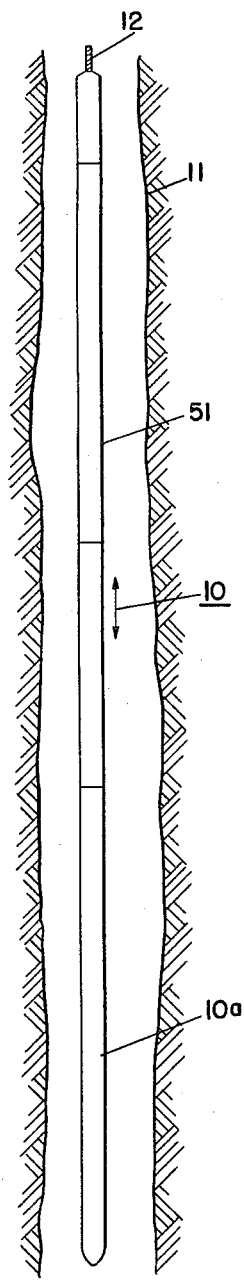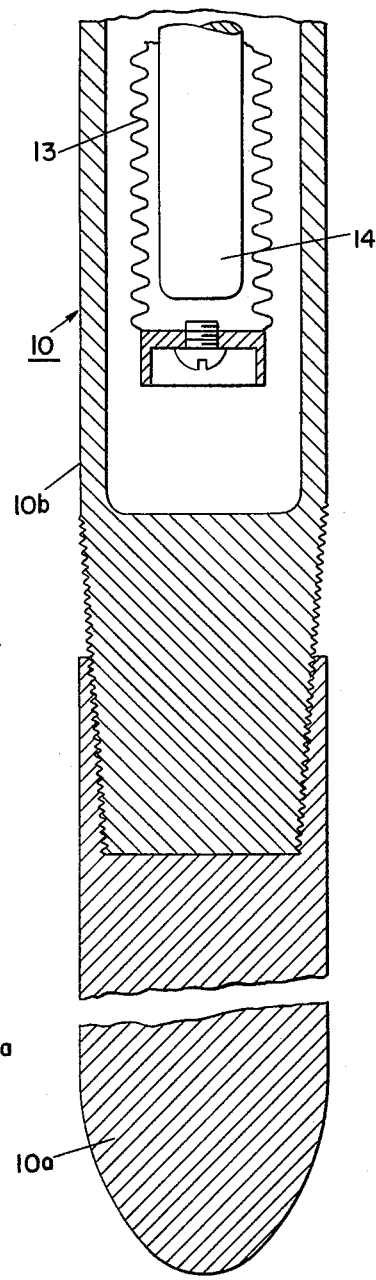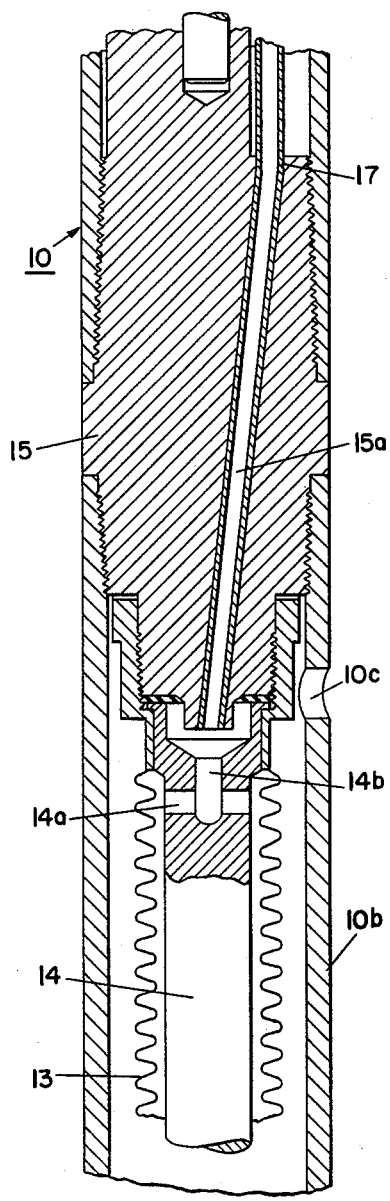

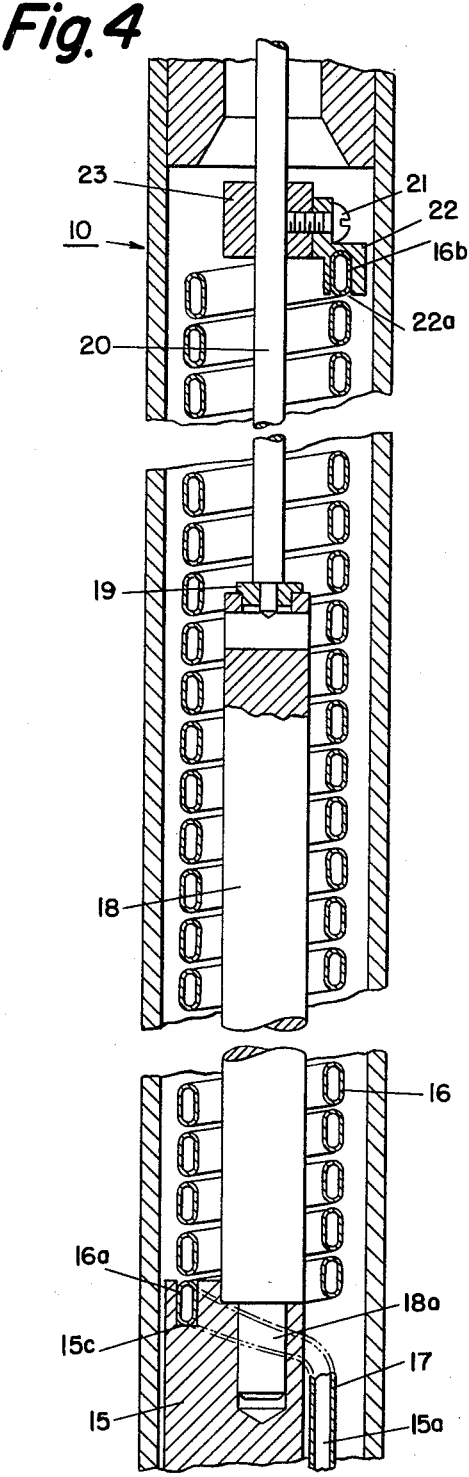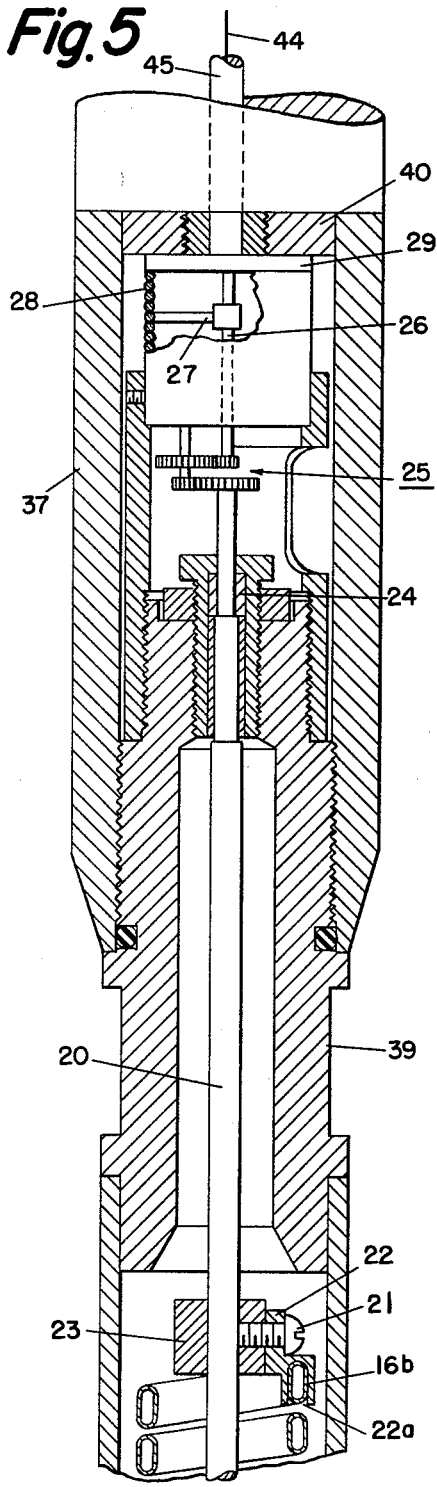

Oct. 11, 1960   J. K. GODBEY ET AL   2,955,463
LOGGING SYSTEM FOR WELL BORES
Filed Jan. 17, 1955   5 Sheets-Sheet 5

United States Patent Office 2,955,463
Patented Oct. 11, 1960

2,955,463

LOGGING SYSTEM FOR WELL BORES

John K. Godbey and Hayden D. Hodges, Dallas, Tex., assignors, by mesne assignments, to Socony Mobil Oil Company, Inc., a corporation of New York Filed Jan. 17, 1955, Ser. No. 482,018

8 Claims. (Cl. 73—152)

This invention relates to instruments for the continuous surveying of well bores and similar passages for the measurement of desired parameters, such as temperature and pressure, at various depths in the well bore. Particularly, this invention makes possible the continuous measurement of sub-surface parameters at the surface of the earth in wells under high pressure and with a restricted surface opening.

It has long been deemed desirable by those familiar with the art to measure at the surface of the earth parameters in production or injection wells. The primary difficulties involved in such a system have been (1) the high well-head pressures, and (2) the restricted opening of the well at the surface of the earth. The high pressure in turn reduces the useful size of cable and hence the number of conductors available to obtain the desired information. The surveying tool also has to be of such a size that its passage through small tubing is possible, i.e., of the order of two inches in diameter. In order to satisfy these conditions, the cross-sectional area of the cable has to be small enough to allow the weight of the small diameter tool to pull it through a packing gland into a high-pressure well. These conditions have been met in the present instance by using a single-conductor armored cable. The parameters measured by the sensing element in the tool are not only transmitted to the surface over this cable, but it is also used as well for transmission of the power required by the downhole instrument.

This system, therefore, provides a means of obtaining a continuous surface record of a selected well parameter versus depth of the instrument, or time, or with respect to any other selected surface measured parameter.

Temperature and pressure are representative of the parameters to be measured. Variations in temperature along the well bore provide valuable information as to the character of the subsurface strata and conditions. In the case of a producing oil well, variations in pressure as the well is brought on stream and variations in pressure when it is taken off stream provide valuable data for determination of the condition of the well. To some extent, the proper production rate to assure maximum ultimate yield of oil from a particular formation can be determined from this information. Direct measurement of fluid flow into or out of the well bore from adjacent strata represents another parameter which can be determined in some cases and which is desirable to measure in evaluating the oil-producing capabilities of a particular formation.

In accordance with the present invention there is located in the bore hole a measuring instrument having a diameter relatively small compared to the diameter of the bore hole and containing not only the elements sensitive to temperature, pressure or flow, and the like, but which also includes an oscillator, the output frequency of which varies in accordance with the selected parameter. The output from the oscillator is then transmitted by way of the single shielded conductor to the surface of the earth where the frequency is converted into a measurement representative of the magnitude of the selected parameter under measurement.

Further in accordance with the invention, the oscillator itself is particularly adapted to the deep-well measuring problem by reason of its novel circuit arrangement, reduced sizes of circuit components and extended frequency range.

For further advantages of the invention and for a more detailed description of the manner of practicing the invention, reference may now be had to the following description taken in conjunction with the accompanying drawings, in which:

Fig. 1 is a side view of the elongated slim tube housing the detecting and transmitting apparatus of the present invention;

Fig. 2 is an enlarged fractional sectional view of the lowermost part of the tube of Fig. 1;

Fig. 3 illustrates that portion of the sensing tube of Fig. 1 above the view of Fig. 2 and in which there is a change in structure;

Fig. 4 is a further enlarged sectional view of that portion of the instrument above Fig. 3;

Fig. 5 is an enlarged sectional view of still another part of the instrument disposed above that of Fig. 4;

Figure 6:
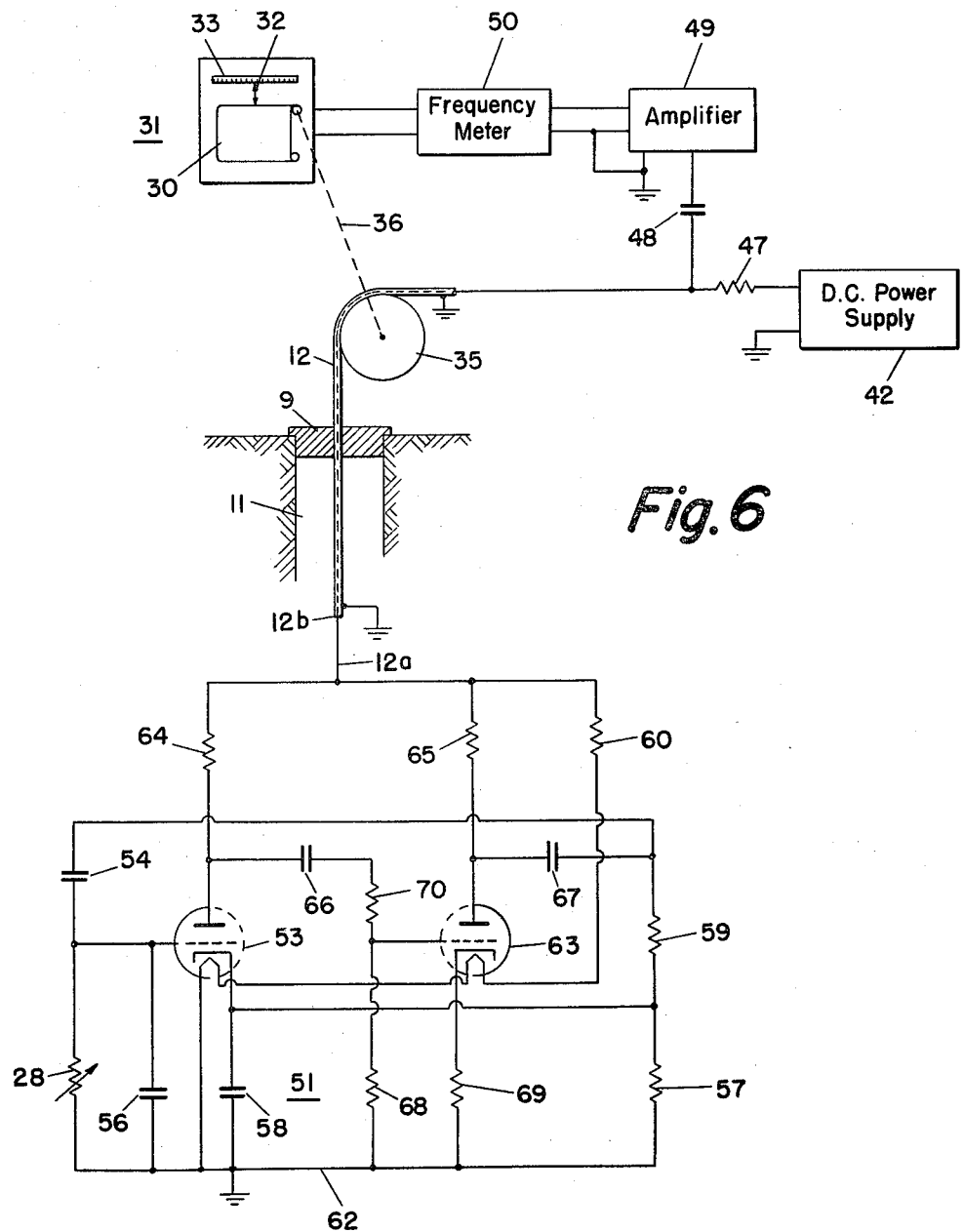
Figure 8:
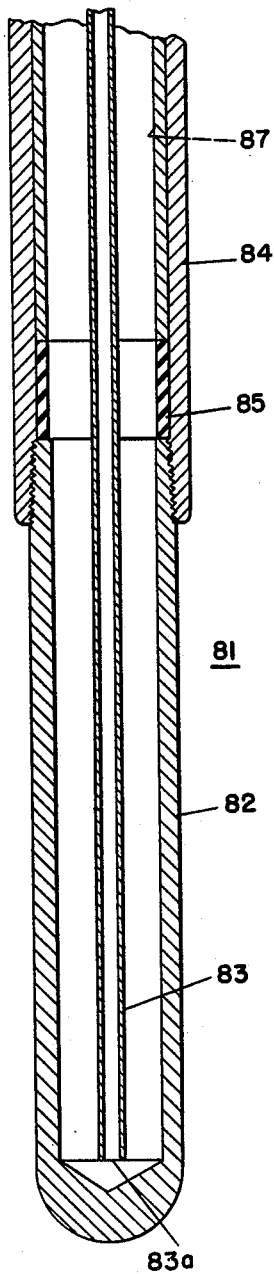
Figure 9:
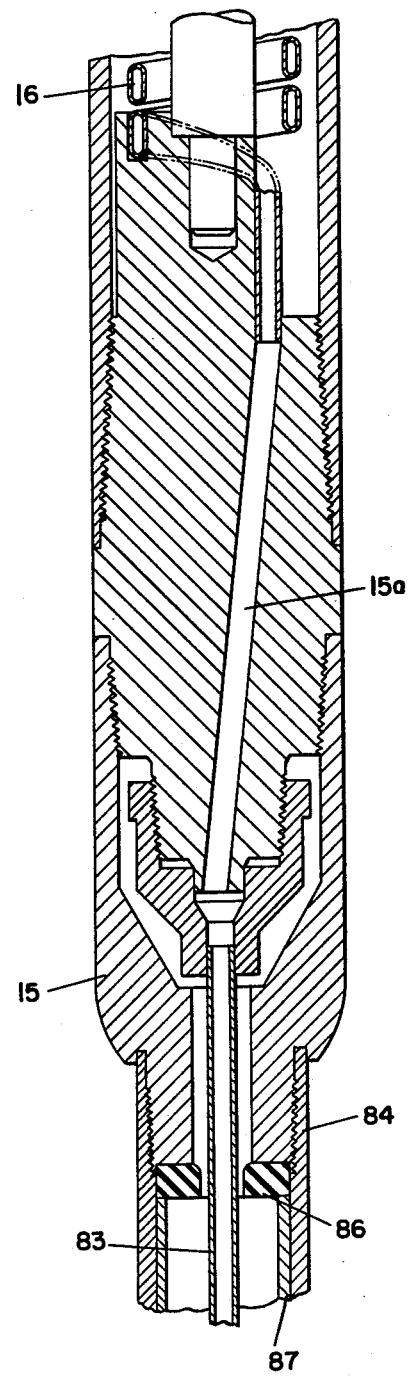

Fig. 6 diagrammatically illustrates the system as applied to the logging of a bore hole and diagrammatically illustrates the oscillator forming an important part of the invention;

Fig. 7 is a graph illustrative of the type of data obtained by the instrument of Figs. 1–6; and Figs. 8, 9 and 10 are enlarged sectional views of modified forms of the invention showing replaceable lower ends for the instrument of Figs. 1–6.

Referring now to Fig. 1, there is illustrated a measuring instrument 10 positioned in a well bore 11. The instrument 10 is in a form of an elongated slim tube having a diameter which is relatively small compared with the diameter of the bore hole 11. As shown in Figs. 1 and 2, the lower end of the instrument 10 terminates in a weighted, bullet-shaped lower end portion 10a. This long, heavy lower end adds weight to the instrument as a whole and assists in assuring its descent to the extent permitted by a supporting cable 12. The cable 12 at the earth's surface extends through a lubricator and packing assembly 9, Fig. 6, of moderate size and thence into the high-pressure well or bore hole 11. In order to minimize its diameter, the cable itself comprises a shielded single electrical conductor 12a and shield and metallic armor 12b. Above the bullet-shaped end 10a, Figs. 1 and 2, there is provided a housing 10b in which there is mounted a bellows 13 secured at its upper end, Fig. 3, to the clamping assembly associated with a cylindrical spacer 14 which, in turn, extends downwardly from an intermediate casting 15. The casing 10b is provided with a port 10c which admits fluid or liquid within the well bore into the interior of the casing 10b, thus subjecting the bellows 13 to the pressure within the well bore. The bellows 13 is preferably filled with a liquid, flow channels 14a and 14b, Fig. 3, being provided in communication with a flow channel 15a extending through the casting 15 and terminating at the upper end, Fig. 4, in flow-communication with the lower end of a Bourdon tube 16. The flow channel 15a may be formed as within the casting 15, or it can be formed by a tubular member 17 extending through an opening in casting 15.

The lower end 16a of the Bourdon tube 16 is held stationary, Fig. 4. To this end, a straight section thereof is shown disposed within a rectangular slot 15c in the casting 15, though it is to be understood that other means can be provided to hold stationary the lower end of the Bourdon tube 16.

The Bourdon tube itself is in the form of a spiral coil which extends upwardly around a shaft support 18, the lower end 18a of which is secured to the casting 15. The shaft support 18 is provided with a shaft bearing 19 at its upper end, the shaft 20 extending upwardly from the bearing and, Figs. 4 and 5, having secured to its intermediate portion, the upper end 16b of the Bourdon tube 16 as by a set screw 21. It will be observed the upper end of the Bourdon tube 16 has a flattened section disposed within a rectangular recess 22a of the clamping member 22 which is itself secured to a collar or block 23 carried by and secured to the shaft 20.

The upper end of the shaft 20, Fig. 5, is journaled within a bearing support 24, and its topmost portion has secured thereto one gear of a gear train 25. The gear train multiplies by ten the movement of the Bourdon tube 16 (through about a single revolution). Thus, a contact member 27 driven from the gear train 25 makes ten revolutions to one of drive shaft 20. The resilient contact 27 is arranged slidably to engage the turns of a resistor which may be in the form of a slidewire 28 mounted within a housing 29 disposed within a main housing 37. The resistor 28 may be of any conventional type, such as a "Helipot."

From the foregoing description, it will be seen that any variations in pressure of the liquid within the bore hole will be transmitted, Figs. 2 to 5, to the bellows 13. Contraction and expansion of bellows 13 in response to change in pressure will cause changing pressure to be exerted upon the Bourdon tube 16. The spirally wound tubing will thereby rotate the shaft 20 in one direction or the other, depending upon whether the pressure is rising or falling, and will thus change the position of the contact 27 relative to the slidewire resistor 28.

The foregoing operations will continue as long as there is change of pressure, and as the instrument 10 is moved to various positions in the bore hole, there will, of course, be changes in pressure which will cause the contact 27 to be moved to correspondingly different positions.

If desired, the position of the instrument 10 in the well bore 11, Fig. 6, can be utilized to actuate a chart 30 of an exhibiting instrument 31 while the pen-index 32 of instrument 31 can be positioned relative to a scale 33 and relative to the chart 30 as by a sensitive measuring instrument of any suitable type of which there are several on the market and may, for example, comprise an electronic type of measuring instrument, such as is fully described in Williams Patent No. 2,113,164.

In Fig. 6 a depth-measuring sheave 35 is shown actuating the chart 30 through an electromechanical connection 36. It will be understood this showing is diagrammatic and ordinarily the drive will be by way of a drum provided for the support of the cable 12, Fig. 1, for the instrument 10. In many cases, the chart 30 will be driven by a synchronous motor to provide a time-scale for the chart against which there will be recorded the variations of pressure, temperature, or other parameter selected for measurement.

The oscillator 51 forms an important part of the present invention for the reasons which have earlier been set forth. The oscillator lends itself to disposition in the small diameter housing and must function properly at the high temperatures encountered in deep wells, temperatures which may range above 200° F. This oscillator has been designed for frequency stability at these temperatures by the proper choice of the frequency-controlling components. The bore hole parameter to be measured is most easily represented as a variable resistance element which produces a corresponding frequency change in the oscillator. Since a single-conductor cable is to be used for the reasons previously set forth, it is necessary to detect this frequency change at the surface as well as to supply power to the oscillator over the single-conductor using the cable armor as the ground return path.

In order to accomplish the foregoing objectives, the oscillator is powered from the surface by means of a direct-current power supply 42 connected to the center conductor 12a and to the grounded cable armor 12b. The oscillator 51 comprises two stages of amplification. The tube 53 is connected as a voltage amplifier in a conventional manner. The tube 63, coupled to tube 53 by impedances 66, 68 and 70, is a power amplifier used to supply a feedback network which functions as a phase-shifting network to determine the frequency of oscillation. In the phase-shifting network which comprises capacitors or condensers 67, 54, 56 and 58 and resistors 57, 59 and 28, the variable resistor 28 is the frequency-determining element. Accordingly, devices whose electrical resistance changes with a parameter to be measured can comprise the variable resistance in the instrument. Such devices will then be connected in place of the variable resistance 28. The frequency range of this oscillator, with circuit components as given in Table I, extends from approximately 7200 cycles per second to 21,000 cycles per second with a variation of the variable resistor from approximately 6000 ohms to approximately 1000 ohms.

This oscillator 51 is particularly suited to bore hole logging and exploration because of the several reasons enumerated below. The variable resistance element 28 which determines the frequency of oscillation has one side at the armor or ground potential. This is important to the application in that a resistor as used in the Wien bridge located above this ground point presents to the input circuit a variable leakage resistance to ground as well as a capacitive effect which is undesirable. Errors so introduced are undesirably large. They are avoided in accordance with the present invention.

By using the single-frequency determining element 28, the input impedance to the first stage is held to a low value. Accordingly, the replacement of such a unit with a new unit or one for measurement of a different parameter can be made without requiring additional adjustments to account for an additional leakage path. The components in the oscillator, especially the capacitors, are held to small values so that reliable operation of the oscillator can be obtained under extreme environmental conditions, such as pressure and temperature. The large capacitors necessary in such circuits as the Wien bridge oscillator result in a shifting of characteristics with an increase in temperature for the reason that they must, in general, be of the electrolytic type in order to approach the space requirements.

The tube used in this oscillator is preferably of the dual triode type such as the 12AU7, though other types may be used. The voltage for the heaters is obtained from the same source 42 as the plate supply voltage. Thus, the single power source 42, which may be a battery, is all that is necessary for the operation of the oscillator.

The signal output of the oscillator is not detected at the plate of the second stage 63 as is normally the case but must be detected at a point along the single conductor 12a of the cable 12. It will be noted that a resistor 47 in series with the surface direct-current power supply 42 provides a high impedance path for the return signal from the oscillator and the condenser 48 connected between the oscillator side of the resistor 47, and the surface amplifier 49 provides a low impedance path for this oscillator signal. It will be evident by those familiar with the art that a choke coil may be used instead of resistor 47 for this purpose.

The signal level at the input to the surface amplifier 49 is of sufficient amplitude in most cases to drive directly a frequency sensing device 50. However, in order to insure a high signal output in all cases, the amplifier 49 is used to feed the input to the frequency meter 50. This frequency meter may be any one of the several commercially available types operating within the foregoing frequency range of from 6500 cycles per second to 21,000 cycles per second. The output of the frequency meter is connected to the recorder 31 which is driven either by the depth-measuring sheave 35 at the well-head, or by a timing device, such as a clock. There is thus provided a means of measuring parameters with respect to either time or depth. In order to obtain a greater degree of accuracy in measuring the oscillator frequency, a conventional and commercially available counter circuit may also be used and fed from the output of the amplifier. Such a counter provides a visual method of determining frequency to an accuracy of approximately one part in 100,000.

The oscillator 51, while somewhat similar to a Wien bridge and also similar to oscillators such as are discussed in Terman's "Radio Engineers' Handbook," 1943, pages 504–505, substantively differs therefrom. In the oscillator 51 there is omitted a resistor in that branch of the bridge including the capacitor 54, and there has been added the capacitor 58 to the branch including the resistor 57. By reason of these two changes, the range of frequency of the oscillator 51 has been greatly extended beyond that of the Wien bridge type of oscillator. When only one element is made variable, the extended frequency range enables greater resolution, greater sensitivity, over a wider range of pressures or other conditions whose magnitudes may be transmitted from different positions along the well bore to the surface of the earth.

With selected values for the circuit components of the oscillator 51 as given in Table I, the frequency range extends from approximately 6500 cycles per second to a maximum of approximately 21,000 cycles per second, the frequency range and the values being by way of example and not of limitation.

Table I

| Capacitors: | Microfarads |
|---|---|
| 48 | 0.05 |
| 54 | 0.005 |
| 56 | 0.001 |
| 58 | 0.02 |
| 67 | 0.01 |
| 66 | 0.047 |
| D.C. supply | volts 225–250 |

| Resistors: | Ohms |
|---|---|
| 28 | 1,000 to 6,000 |
| 57 | 1,000 |
| 59 | 50,000 |
| 60 | 1,000 |
| 64 | 20,000 |
| 65 | 10,000 |
| 68 | 500,000 |
| 69 | 2,000 |
| 70 | 500,000 |
| 47 | 250 |

The oscillator 51 with its extended frequency range operates within the wide-range frequency transmitting characteristics of the cable-line 12.

The heaters for the cathodes of the dual triode tube (53, 63) are preferably connected in series to reduce to a minimum the losses (and resultant temperature rise) of heater current-adjusting resistor 60.

An inspection of the oscillator 51 will further reveal that it is provided with an even number of stages respectively formed by the triodes 53 and 63. The feedback circuit from the output of the final tube or stage 63 comprises a phase-correcting network. That network, of the bridge type, has two branches connected in parallel. The feedback circuit loop is completed across one diagonal of the bridge by way of the common ground connection and a capacitor 67 which is in series with both branches.

One of said branches formed by resistance means, such as resistors 59 and 57, forms a voltage-divider, while the other branch includes both a parallel circuit including the variable resistor 28 shunted by a capacitor 56 and also the capacitor 54 in series with the parallel circuit. The last-named branch is characterized by the presence of only capacitance in series with the parallel circuit formed by resistor 28 and capacitor 56. The resistor 57 is shunted by capacitor 58, as noted above. The foregoing are emphasized as substantive differences over circuits of the Wien bridge type.

As shown in Fig. 6, connections to the input of the first stage formed by the triode 53 extend from the juncture of the two resistors 59 and 57 of the voltage-divider and from the juncture of series capacitor 54 and the parallel circuit formed by resistor 28 and capacitor 56. It is further emphasized that one side of the variable resistor 28 is connected to ground, i.e., the low potential side of the output of the final stage 63 with respect to the anode potential side thereof. The importance of this latter feature has already been set forth at length.

Referring now to Fig. 7, there has been illustrated a graph plotted with pressure as abscissae and time as ordinates. The curve 72 illustrates the rise of pressure against time when a flowing well is abruptly shut off. The pressure immediately rises and rather abruptly, the pressure thereafter rising at a more gradual rate and then increasing at a greater rate until a maximum is reached.

The graph 73 is illustrative of the decrease in pressure when a well is opened and placed into operation. The high pressure gradually decreases in a somewhat irregular manner. The pressure-sensing element need not be of the illustrated "Amerada" type, but may comprise other arrangements for adjusting the variable resistor 28, Fig. 5, with change in pressure. The gear train 25 is a desirable but not an essential feature of the invention. The mechanical amplification provided by the gear train contributes to enhanced resolution of the condition or parameter under measurement.

The ease with which instrument 10 of Figs. 1–6 can be converted to the measurement of temperature will be readily understood by referring to Figs. 8 and 9. Figs. 8 and 9 illustrate one form of a replaceable lower end for the instrument 10 comprising a temperature-sensing element 81 having a weighted lower end formed at the lower end of a housing 82 which is hollow and filled with an expansible liquid, such as alcohol, or the like. The liquid within the casing 82 is flow-connected to a central pipe 83 open at its lower end 83a and extending upwardly, Fig. 9, through a second tubular connecting element 84 which is itself threaded to the body member or casting 15, suitable gaskets being provided, such as indicated at 85 and 86. A liner member 87 may also be provided for the outer housing 84 of Figs. 8 and 9. The inner pipe 83 is flow-connected to the channel 15a which extends upwardly to the lower end of the Bourdon tube 16.

As further exemplary of the flexibility of the invention and also forming part of the novel subject matter, reference may now be had to Fig. 10 where we have shown a different type of temperature-sensitive element which is adapted to be utilized in conjunction with Fig. 5. Referring first to Fig. 5, it will be observed that the slide-wire resistor 28 and its associated contact 27 is housed within the connecting member 29 which is itself threaded into a supporting member 40 of the outer cylindrical housing 37. By unthreading the connecting member 29 from the cylindrical member 37, the assembly including the slidewire resistor 28 may be removed.

The temperature-sensitive element of Fig. 10 may then be threaded into the supporting member 40. An O-ring 89 provides a seal between the body 90 and the cylindrical element 37. Extending downwardly and below the lower end of the cylindrical member 37 is a cylindrical member 91 which has embedded therein the conductor elements and insulating material 93 which terminates in inwardly spaced relation from the lower end of the cylinder 91. A temperature-sensitive element, such as a thermistor 92, partly protrudes from the insulating material 93 which may be plastic or ceramic in character. The thermistor itself in one application of the invention was but ½″ long. It has a low thermal time lag and thus makes possible rapid response of the instrument to change in temperature as the instrument is raised and lowered within the well bore. The thermistor 92, whose resistance varies with change in temperature, is connected directly into the bridge 52 of the oscillator 51 in place of the slidewire resistor 28.

Obviously, the thermistor 92 may be mounted in the arrangement of Figs. 1–6 with a switch to substitute the thermistor 92 in the oscillator 51 for the resistor 28.

When the thermistor 92 is connected into the oscillator 51, the change in resistance of the thermistor will not be linear with change in temperature. However, neither is the change in frequency of the oscillator 51 linear with change of resistance. The change in frequency with change in resistance of the thermistor closely matches the thermistor characteristics to provide a linear frequency output with respect to change in temperature. Where other parameters are being measured, such as pressure, the slidewire or variable resistance 28 will preferably be non-linear to provide a linear output with change of pressure. Other arrangements, of course, can be used to provide linear output, or the non-linear output may be directly used in the invention with a calibration curve or other corrective means.

It shall be understood the invention is not limited to the specific arrangements shown, and that changes and modifications may be made within the scope of the appended claims.

What is claimed is:

1. A well-logging instrument comprising an elongated housing, an oscillator enclosed within said housing and bodily movable as said housing is raised and lowered in the well, a cable-conducting means extending from the surface of the earth downwardly to said oscillator and forming a current path for said oscillator, frequency-responsive means located at the surface of the earth and coupled to said conducting means, said oscillator comprising an even number of amplifier stages and having an extended frequency range, a frequency-determining and phase-correcting network having two branches connected in parallel providing feedback means and means to maintain phase relations between input and output of said oscillator to maintain oscillations, a capacitor in series with both said branches, said capacitor in series with said branches being connected across the output of a final one of said stages, one said branch including a pair of resistors forming a voltage divider, a capacitor in shunt with one of said resistors, the other of said branches including a parallel circuit including a variable resistor shunted by a capacitor and also including a capacitor in series with said parallel circuit, said last-named branch circuit being characterized by the presence of only capacitance in series with said parallel circuit, one side of said variable resistance being common to the low potential side of the output of said final stage as compared with the high potential anode side thereof, connections to the input of a first one of said stages extending from the juncture of said two resistors and from the juncture of said series capacitor and said parallel circuit, and means for varying said variable resistance in response to change in the magnitude of the condition within said well bore, said frequency having a value determined by the value of said variable resistance.

2. In an oscillator having an even number of amplifier stages, the combination of a feedback circuit from the output of a final stage to the input of a first stage comprising a phase-correcting network having two branches connected in parallel providing feedback means and means to maintain phase relations between input and output of said oscillator for oscillations therein, a capacitor in series with both branches, one said branch including resistance means forming a voltage divider and the other of said branches including a parallel circuit including a variable resistor shunted by a capacitor and also including a capacitor in series with said parallel circuit, said last-named branch circuit being characterized by the presence of only capacitance in series with said parallel circuit, connections to the input of said first stage extending from said voltage divider and from the juncture of said series capacitor and said parallel circuit, and one side of said variable resistor being common to the low potential side of the output of said final stage with respect to the anode potential side thereof.

3. An oscillator of an even number of amplifier stages and having an extended frequency range, comprising a frequency-determining and phase-correcting network having two branches connected in parallel providing feedback means and means to maintain phase relations between input and output of said oscillator for oscillations therein, a capacitor in series with both said branches, said capacitor in series with said branches being connected across the output of a final stage, one said branch including a pair of resistors forming a voltage divider, a capacitor in shunt with one of said resistors, the other of said branches including a parallel circuit including a variable resistor and a first capacitor connected across said variable resistor, a second capacitor connected in series with said parallel circuit, said last-named branch circuit being characterized by the presence of only capacitance in series with said parallel circuit, one side of said variable resistance being common to the low potential side of the output of said final stage as compared with the high potential anode side thereof, and connections to the input of a first one of said stages extending from the juncture of said two resistors and from the juncture of said series capacitor and said parallel circuit.

4. A logging instrument for well bores comprising an elongated housing, an oscillator located within said said housing, a variable resistor variable with change of a selected condition within said well bore and included in said oscillator circuit for determining the output frequency thereof, a cable conductor extending from the surface of the earth downwardly of said well bore for supplying electrical energy to said oscillator, means located at the surface of said earth responsive to the frequency of said oscillator for indicating the magnitude of said selected condition within said bore hole, said oscillator having an even number of amplifier stages and an extended frequency range, a frequency-determining and phase-correcting network having two branches connected in parallel providing feedback means and means to maintain phase relations between input and output of said oscillator for oscillations therein, a capacitor in series with both said branches, said capacitor in series with said branches being connected across the output of a final one of said stages, one said branch including a pair of resistors forming a voltage divider, a capacitor in shunt with one of said resistors, the other of said branches including a parallel circuit including a variable resistor and a first capacitor connected across said variable resistor, a second capacitor connected in series with said parallel circuit, said last-named branch circuit being characterized by the presence of only capacitance in series with said parallel circuit, one side of said variable resistance being common to the low potential side of the output of said final stage as compared with the high potential anode side thereof, and connections to the input of a first of said stages extending from the juncture of said two resistors and from the juncture of said series capacitor and said parallel circuit.

5. A well-logging instrument comprising an elongated housing, an oscillator enclosed within said housing, said oscillator comprising a bridge circuit having four arms, each pair of them respectively forming two parallel branches, one branch including in series relation between one diagonal of the bridge two resistors forming a voltage divider and the other branch including in series relation between the same diagonal of the bridge a capacitor and a wide-range variable resistor, an oscillator with an input tube having an input circuit extending across the other diagonal of the bridge and between the juncture of said resistors and the juncture between said series-connected resistor and capacitor, the two arms on one side of said last-named diagonal being characterized by the inclusion only of said series-connected capacitor and one of the resistors of said voltage divider, the other two arms of said bridge being characterized by a capacitor connected in shunt with the resistor included in each said arm, cable-conducting means extending from the surface of the earth downwardly to said unit and forming a current path for supplying the operating current to said oscillator and also forming a signal path from said oscillator to the earth's surface, means disposed within said housing and responsive to the magnitude of a condition within the bore hole for changing the resistance of said wide-range variable resistor in accordance with change in the magnitude of said condition to vary the frequency of said oscillator, and frequency-responsive means coupled to said cable-conducting means for indicating the magnitude of said condition.

6. The instrument of claim 5 in which said oscillator comprises an even number of amplifier stages, a feedback connection from the output of a final one of said stages comprising a cathode connection to one side of said first-named diagonal of said bridge and a connection from the anode circuit to the other side of said first-named diagonal of said bridge, said last-named connection including a coupling capacitor.

7. A well-logging instrument comprising an elongated housing, an oscillator enclosed within said housing, cable-conducting means extending from the surface of the earth downwardly to said housing and forming a current path for supplying the operating current to said oscillator and also forming a signal path from said oscillator to the earth's surface, said oscillator including a frequency-determining circuit of a bridge configuration having four arms, each pair of said arms respectively forming two parallel branches, one branch including in series relation between one diagonal of the bridge two resistors forming a voltage divider and the other branch including in series relation between the same diagonal of the bridge a capacitor and a multiple-turn variable resistor, an oscillator input tube having an input circuit extending across the other diagonal of the bridge and between the juncture of said resistors and the juncture between said series-connected resistor and capacitor, the two arms on one side of said last-named diagonal being characterized by the inclusion only of said series-connected capacitor and one of the resistors of said voltage divider, and the other two arms of said bridge being characterized by a capacitor connected in shunt with the resistor included in each said arm, said multiple-turn variable resistor adjustable to vary the frequency of said oscillator, an elongated Bourdon tube of spiral configuration anchored at one end and connected at the opposite end to produce relative rotation between said adjustable resistor and an associated contact, means for varying the pressure within said Bourdon tube in accordance with the magnitude of a condition within the borehole for producing said relative rotation to vary the frequency of said oscillator in a manner dependent upon the magnitude of said condition, and frequency-responsive means coupled to said cable-conducting means for indicating the magnitude of said condition.

8. A well-logging instrument comprising an elongated housing, an oscillator enclosed within said housing, cable-conducting means extending from the surface of the earth downwardly to said housing and forming a current path for supplying the operating current to said oscillator and also forming a signal path from said oscillator to the earth's surface, said oscillator comprising an even number of amplifier stages and including a bridge circuit having four arms, each pair of said arms respectively forming two parallel branches, a feedback connection from the output of the last of said amplifier stages comprising a cathode connection to one side of a first diagonal of said bridge and a connection from the anode circuit to the other side of said first diagonal of said bridge, said last-named connection including a capacitor, one branch of said bridge including in series relation between one diagonal of the bridge two resistors forming a voltage divider and the other branch including in series relation between the same diagonal of the bridge a capacitor and a multiple-turn variable resistor, an oscillator input tube having an input circuit extending across the other diagonal of the bridge and between the juncture of said resistors and the juncture between said series-connected resistor and capacitor, the two arms on one side of said last-named diagonal being characterized by the inclusion only of said series-connected capacitor and one of the resistors of said voltage divider, and the other two arms of said bridge being characterized by a capacitor connected in shunt with the resistor included in each said arm, said multiple-turn variable resistor adjustable to vary the frequency of said oscillator, an elongated Bourdon tube of spiral configuration anchored at one end and connected at the opposite end to produce relative rotation between said adjustable resistor and an associated contact, means for varying the pressure within said Bourdon tube in accordance with the magnitude of a condition within the borehole for producing said relative rotation to vary the frequency of said oscillator in a manner dependent upon the magnitude of said condition, the frequency-responsive means coupled to said cable-conducting means for indicating the magnitude of said condition.

References Cited in the file of this patent

UNITED STATES PATENTS

| 2,370,818 | Silverman | Mar. 6, 1943 |
|---|---|---|
| 2,379,996 | Silverman | July 10, 1945 |
| 2,436,563 | Frosch | Feb. 24, 1948 |
| 2,547,876 | Krasnow | Apr. 3, 1951 |
| 2,619,534 | Payne | Nov. 25, 1952 |
| 2,650,067 | Martin | Aug. 25, 1953 |
| 2,669,877 | Dunlap | Feb. 23, 1954 |
| 2,690,674 | Thomas | Oct. 5, 1954 |
| 2,733,605 | Buck | Feb. 7, 1956 |

FOREIGN PATENTS

| 497,148 | Great Britain | Dec. 12, 1938 |